United States Patent
Komoto (12)

(10) Patent No.: US 6,273,814 B1
(45) Date of Patent: Aug. 14, 2001

(54) GAME APPARATUS AND METHOD FOR CONTROLLING TIMING FOR EXECUTIVE ACTION BY GAME CHARACTER

(75) Inventor: Nobuaki Komoto, Honolulu, HI (US)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/426,195

(22) Filed: Oct. 25, 1999

(51) Int. Cl.[7] .................................................. A63F 9/22
(52) U.S. Cl. .................................................. 463/7; 463/43
(58) Field of Search .............................. 463/1, 7–8, 30, 463/31, 36, 43–44; 700/91

(56) References Cited

U.S. PATENT DOCUMENTS 5,390,937    2/1995   Sakaguchi et al. .
5,649,862    7/1997   Sakaguchi et al. .

*Primary Examiner*—Mark Sager
(74) *Attorney, Agent, or Firm*—Greenblum & Bernstein, P.L.C.

(57) ABSTRACT

A game apparatus and method quickens the progress of a game when controlling, based on an elapsed time, permission to execute action that can be performed by a game character. In the game apparatus and method, a game character which executes an action after a preset time elapses, and the preset time, are stored in a memory, with the game character corresponding to the preset time. By reading and adjusting a preset time for at least one game characters excluding the present game character, it is determined whether the corresponding game character is permitted to execute an action In accordance with whether the adjusted preset time elapses.

16 Claims, 16 Drawing Sheets

Fig.5

| LEVEL | ADD-TIME |
|---|---|
| 1~4 | 30 |
| 5~9 | 25 |
| 10~14 | 20 |
| 15~19 | 20 |
| 20 OR MORE | 15 |

| NAMES OF ENEMY CHARACTERS | STANDBY-TIME DATA 152 |
|---|---:|
| RED DRAGON | 150 |
| BLUE DRAGON | 170 |
| HEAVY TANK | 85 |
| BOMB | 90 |
| SCREAMER | 125 |
| DEVIL | 30 |
| ⋮ | ⋮ |

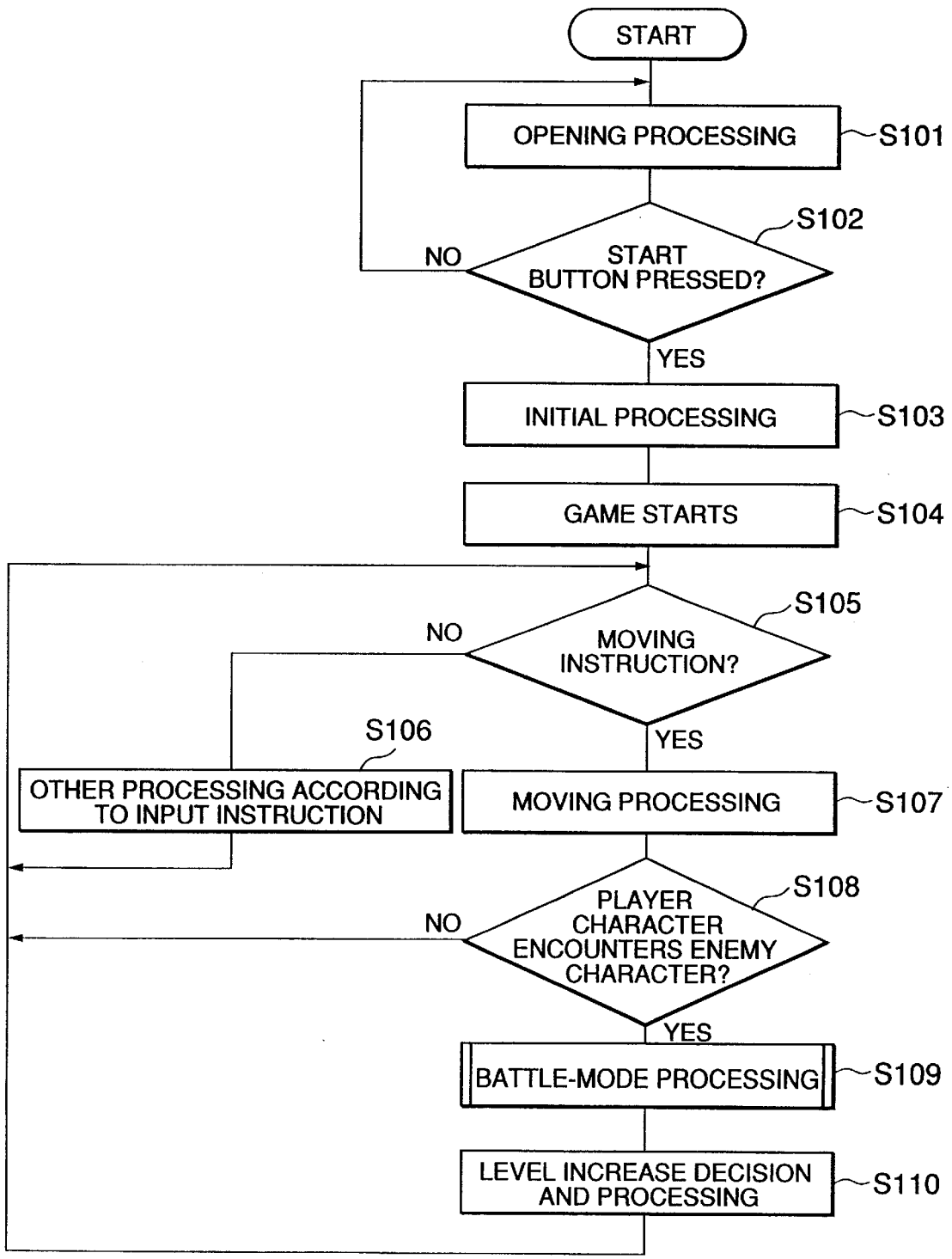

| LEVEL | SUBTRACTION-TIME |
|---|---|
| 1~4 | 30 |
| 5~9 | 25 |
| 10~14 | 20 |
| 15~19 | 20 |
| 20 OR MORE | 15 |

GAME APPARATUS AND METHOD FOR CONTROLLING TIMING FOR EXECUTIVE ACTION BY GAME CHARACTER

BACKGROUND OF THE INVENTION

1. Field of the Invention

The present invention relates to game apparatus for controlling permission to execute action that can be performed by a game character, and methods for adjusting timing for executing actions performed by the game character based on elapsed time.

2. Description of the Related Art

Recently, role-playing games (RPGs) are known as one genre of video games. In RPGs, a character (hereinafter referred to as a "Player Character") controlled by a player develops by experiencing encounters with other characters which are companions, parting from them, and fighting with enemy characters. The player uses the player character to struggle for world created by the game, or to solve mysteries or uncover secrets. Accordingly, in general, RPGs are games with player characters which develop as a game story progresses.

In many RPGs, a player character fights against an enemy character in accordance with predetermined rules, and gradually develops by gaining fighting experience. This type of game in which the player character fights against the enemy character includes games of various genres such as simulation games (hereinafter referred to as "SLGs") and adventure games (hereinafter referred to as "ADGs"), in addition to RPGs.

A publication related to this type of technology is U.S. Pat. No. 5,390,937.

In games using the above-described technology, permission for layer and enemy characters to execute a possible action such as attacking, defending, moving, or using an item, is controlled based on the time elapsed from the start of a fight, or the time elapsed after the execution of an action. In games controlling permission to execute action, in general, whenever one standby time set for each character expires, one action is permitted to be executed by the other character (e.g. it becomes the other character's turn.).

SUMMARY OF THE INVENTION

Accordingly, it is an object of the present invention to provide a game apparatus that speeds up the progress of a game when controlling permission to execute action that can be performed by a game character based on an elapsed time, a method for adjusting timing at which the game character executes an action, and a recording medium therefor.

According to one aspect of the present invention, there is provided a game apparatus in which a first character and a second character are displayed and the first character and the second character carry out attacks on each other in accordance with an inputted action command or a predetermined action schedule, the game apparatus comprising setting means for setting an action timing at which the second character executes an action; adjustment means for adjusting the action timing set by the setting means in accordance with the inputted action command for the first character; and determination means for determining whether or not the second character is permitted to execute an action in accordance with whether or not the action timing adjusted by the adjustment means has come.

It may be arranged that the game apparatus further comprises clock means for clocking a rest time until the action timing adjusted by adjustment means; and display means for displaying the rest time clocked by the clock means.

According to another aspect of the present invention, there is provided a game apparatus in which a first character and a second character are displayed and the first character and the second character carry out attacks on each other in accordance with an inputted action command or a predetermined action schedule, the game apparatus comprising clock means for clocking a time from end of a previous action of the second character or a predetermined reference time to provide a clock time; adjustment means for adjusting the clock time clocked by the clock means in accordance with the inputted action command for the first character; and determination means for determining whether or not the second character is permitted to execute an action in accordance with whether or not the clock time adjusted by the adjustment means is equal to or greater than a set time preset for the second character which possible to execute an action after the set time elapses.

It may be arranged that the adjustment means comprises addition means for adding a predetermined value to a value of the clock time clocked by the clock means to provide an addition value, in accordance with the inputted action command for the first character; and replacement means for replacing a value of the clock time to be clocked by the clock means with the addition value.

It may be arranged that the game apparatus further comprises display means for displaying the clock time and the set time.

It may be arranged that the game apparatus further comprises display means for displaying the clock time and the set time, wherein the time display means displays a ratio of the clock time to the set time by means of a graph.

According to another aspect of the present invention, there is provided a game apparatus in which a first character and a second character are displayed and the first character and the second character carry out attacks on each other in accordance with an inputted action command or a predetermined action schedule, the game apparatus comprising clock means for clocking a time from end of a previous action of the second character or a predetermined reference time to provide a clock time; adjustment means for adjusting a set time preset for the second character which possible to execute an action after the set time elapses, in accordance with the inputted action command for the first character; and determination means for determining whether or not the second character is permitted to execute an action in accordance with whether or not the clock time clocked by the clock means is equal to or greater than the set time adjusted by the adjustment means.

It may be arranged that the adjustment means comprises subtraction means for subtracting a predetermined value from a value of the set time read out the memory to provide a subtraction value, in accordance with the inputted action command for the first character; and replacement means for replacing a value of the set time with the subtraction value.

It may be arranged that the game apparatus further comprises display means for displaying the clock time and the set time.

It may be arranged that the game apparatus further comprises display means for displaying the clock time and the set time, wherein the time display means displays a ratio of the clock time to the set time by means of a graph.

According to another aspect of the present invention, there is provided a method of adjusting an action timing of a character in a video game in which a first character and a second character are displayed and the first character and the second character carry out attacks on each other in accordance with an inputted action command or a predetermined action schedule, the method comprising a setting step for setting an action timing at which the second character executes an action; an adjustment step for adjusting the action timing set in the setting step in accordance with the inputted action command for the first character; and a determination step for determining whether or not the second character is permitted to execute an action in accordance with whether or not the action timing adjusted in the adjustment step has come.

According to another aspect of the present invention, there is provided a method of adjusting an action timing of a character in a video game in which a first character and a second character are displayed and the first character and the second character carry out attacks on each other in accordance with an inputted action command or a predetermined action schedule, the method comprising a clock step for clocking a time from end of a previous action of the second character or a predetermined reference time to provide a clock time; an adjustment step for adjusting the clock time clocked in the clock step in accordance with the inputted action command for the first character; and a determination step for determining whether or not the second character is permitted to execute an action in accordance with whether or not the clock time adjusted in the adjustment step is equal to or greater than a set time preset for the second character which possible to execute an action after the set time elapses.

According to another aspect of the present invention, there is provided a method of adjusting an action timing of a character in a video game in which a first character and a second character are displayed and the first character and the second character carry out attacks on each other in accordance with an inputted action command or a predetermined action schedule, the method comprising a clock step for clocking a time from end of a previous action of the second character or a predetermined reference time to provide a clock time; an adjustment step for adjusting a set time preset for the second character which possible to execute an action after the set time elapses, in accordance with the inputted action command for the first character; and a determination step for determining whether or not the second character is permitted to execute an action in accordance with whether or not the clock time clocked in the clock step is equal to or greater than the set time adjusted in the adjustment step.

According to another aspect of the present invention, there is provided a computer-readable storage medium storing a program for causing a computer to execute a video game in which a first character and a second character are displayed and the first character and the second character carry out attacks on each other in accordance with an inputted action command or a predetermined action schedule, the program comprising a first step for setting an action timing at which the second character executes an action; a second step for adjusting the action timing set in the first step in accordance with the inputted action command for the first character; and a third step for determining whether or not the second character is permitted to execute an action in accordance with whether or not the action timing adjusted in the second step has come.

According to another aspect of the present invention, there is provided a computer-readable storage medium storing a program for causing a computer to execute a video game in which a first character and a second character are displayed and the first character and the second character carry out attacks on each other in accordance with an inputted action command or a predetermined action schedule, the program comprising a first step for clocking a time from end of a previous action of the second character or a predetermined reference time to provide a clock time; a second step for adjusting the clock time clocked in the first step in accordance with the inputted action command for the first character; and a third step for determining whether or not the second character is permitted to execute an action in accordance with whether or not the clock time adjusted in the second step is equal to or greater than a set time preset for the second character which possible to execute an action after the set time elapses.

According to another aspect of the present invention, there is provided a computer-readable storage medium storing a program for causing a computer to execute a video game in which a first character and a second character are displayed and the first character and the second character carry out attacks on each other in accordance with an inputted action command or a predetermined action schedule, the program comprising a first step for clocking a time from end of a previous action of the second character or a predetermined reference time to provide a clock time; a second step for adjusting a set time preset for the second character which possible to execute an action after the set time elapses, in accordance with the inputted action command for the first character; and a third step for determining whether or not the second character is permitted to execute an action in accordance with whether or not the clock time clocked in the first step is equal to or greater than the set time adjusted in the second step.

Other purposes of this invention will be clarified by reference to the following detailed description of the preferred embodiments and claims based on the following attached figures.

BRIEF DESCRIPTION OF THE DRAWINGS

FIG. 5 is an add-time control table stored in the related-data storage area shown in FIG. 3.

FIG. 6 is a standby-time setting table stored in the related-data storage area shown in FIG. 3.

FIG. 8 is a flowchart showing a main process according to the first embodiment of the present invention.

FIG. 12 is a subtraction-time control table stored in a related-data storage area according to the second embodiment of the present invention.

DESCRIPTION OF THE PREFERRED EMBODIMENTS

The present invention will be described below based on its embodiments, with reference to the attached drawings. The following description relates to applications of the present invention to a home game machine.

First Embodiment

Figure 1:
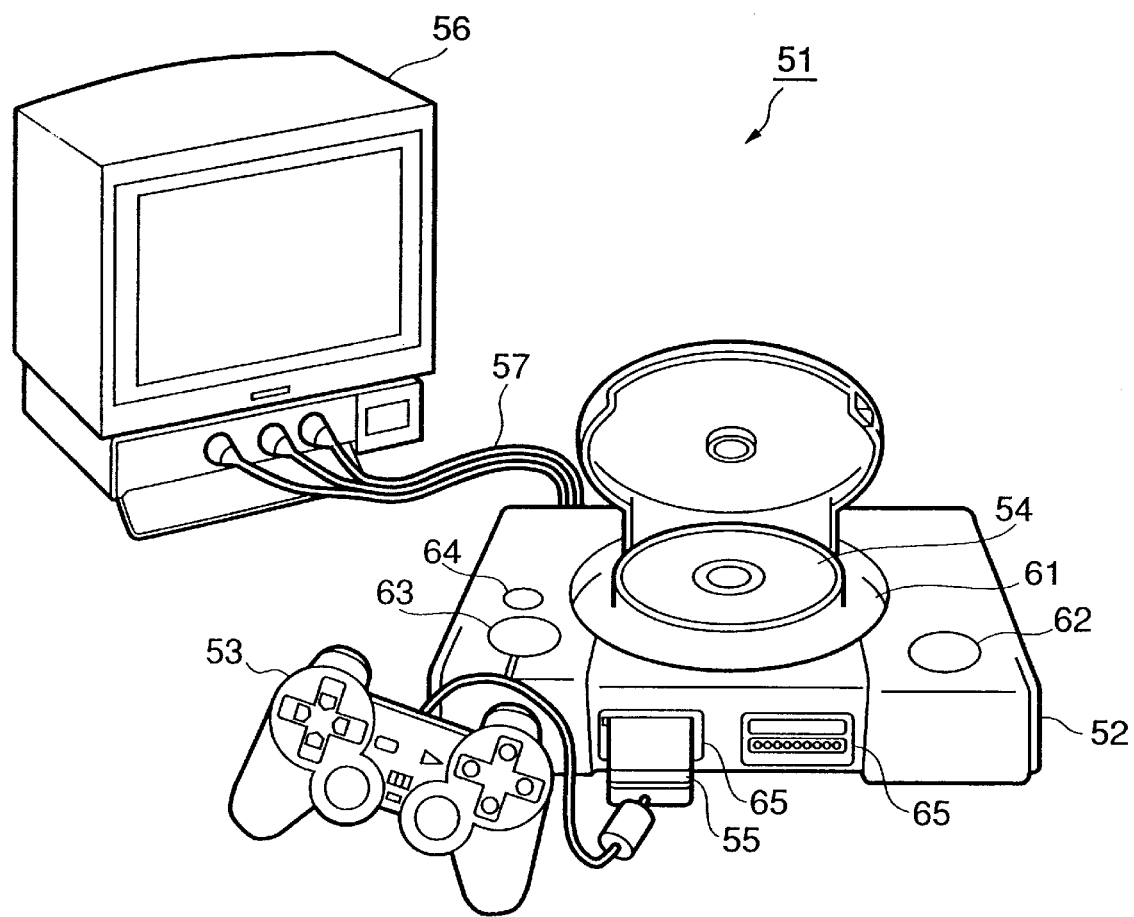
FIG. 1 is an overall view showing a game system according to the first embodiment of the present invention.

FIG. 1 shows a schematic overall view of game system 51 according to the first embodiment of the present invention. The game system 51 chiefly includes a game machine 52, a compact-disk read-only memory (CD-ROM) 54, a memory card 55, and a monitor display 56. The game machine 52 has main functions of the game system 51. A controller 53 inputs operation instructions to the game machine 52. The CD-ROM 54 contains programs, image data, sound data, etc., for enabling processes related to a game (described below). The memory card 55 is used to store game data such as game-progress data and game-environment-settings data. The monitor display 56 displays pictures in accordance with game scenes, based on picture signals and sound signals from the game machine 52, and simultaneously outputs sound.

On the top of the game machine 52 is a disk holder 61 for setting the CD-ROM 54, an open button 62 for opening the disk holder 61, a power button 63, and a reset button 64. On the front of the game machine 52 are slots 65 for the controller 53 and the memory card 55. The controller 53 and the memory card 55 can be attached to and detached from the game machine 52 through the slots 65. On the back of the game machine 52 is an audio-and-visual (AV) output unit (not shown) to which AV cables 57 are connected. The monitor display 56 is connected to the game machine 52 via the AV cables 57. A cathode ray tube or the like can be used as the monitor display 56.

Figure 2:
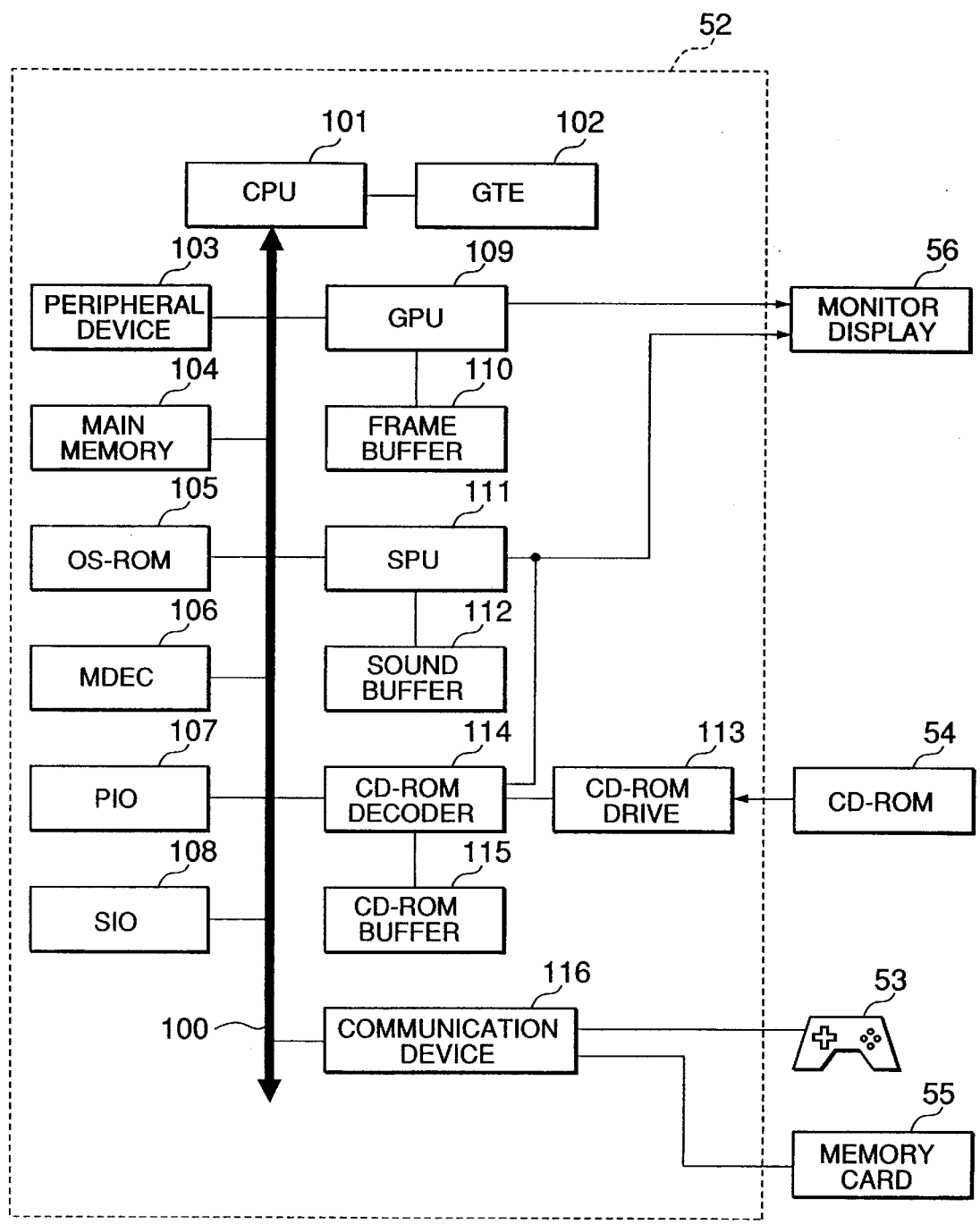
FIG. 2 is a block diagram showing a game machine and its peripheral units.

FIG. 2 shows a block diagram of the connection between the circuits of the game machine 52 and its peripheral units. The game machine 52 includes a central processing unit (CPU) 101, a geometric transform engine (GTE) 102, a peripheral device 103, a main memory 104, an operating-system read-only memory (OS-ROM) 105, a motion decoder (MDEC) 106, a parallel input/output (PIO) 107, a serial input/output (SIO) 108, a graphics processing unit (GPU) 109, a frame buffer 110, a sound processing unit (SPU) 111, a sound buffer 112, a CD-ROM drive 113, a CD-ROM decoder 114, a CD-ROM buffer 115, and a communication device 116.

The CPU 101, the peripheral device 103, the main memory 104, the OS-ROM 105, the MDEC 106, the PIO 107, the SIO 108, the GPU 109, the SPU 111, the CD-ROM decoder 114, and the communication device 116, are connected by a bus 100.

The CPU 101 controls the other blocks of the game machine 52, based on an OS stored in the OS-ROM 105, and programs and data that are stored in the main memory 104 after being read from the CD-ROM 54.

Specifically, the CPU 101 reads a game program and modeling data for three-dimensional models and transfers them to the main memory 104. Likewise, the CPU 101 reads the color look-up table (CLUT) and texture pattern data from the CD-ROM 54, and transfers them to the frame buffer 110 before sending instructions for rendering to the GPU 109.

In response to the instruction from the CPU 101, the GPU 109 performs modeling and rendering based on coordinate data and color information computed by the GTE 102 and the CLUT and texture pattern data stored in the frame buffer 110. The GPU 109 stores image data generated by projecting into a two-dimensional space an arbitrary region in a virtual three-dimensional space having three-dimensional models in the frame buffer 110. A picture signal is generated based on the image data, and is supplied to the monitor display 56. This makes it possible to display a picture in accordance with a game scene on the screen of the monitor display 56.

The CPU 101 reads the sound data from the CD-ROM 54 and transfers it to the main memory 104 and the SPU 111 before sending an instruction for reproducing sound to the SPU 111. In response to this instruction, the SPU 111 appropriately executes processes for modulating and reproducing the sound data. The SPU 111 combines the reproduced sound data with the reproduced audio data transferred from the CD-ROM decoder 114 to generate a sound signal, and sends it to the monitor display 56. This makes it possible to output background music (BGM) and sound effects from the built-in speaker (not shown) of the monitor display 56.

The CPU 101 generates a clock signal based on a timing signal supplied from an oscillator (not shown). The CPU 101 can perform time measurement using its built-in timer counter (not shown) to measure the clock signal.

The GTE 102 can operate as a co-processor for the CPU 101 because it is connected to the CPU 101. The GTE 102 performs fixed-point-matrix and vector operations in accordance with an arithmetical instruction from the CPU 101. The fixed-point-matrix and vector operations include, for example, coordinate computation for the movement, rotation, enlargement, and reduction of each of three-dimensional coordinate data constituting a three-dimensional model; computation for perspective projection to two-dimensional data; and brightness computation for computing the brightness of each point of a model in accordance with the type of virtual light source provided in a scene, and for computing the brightness of each point of the model in accordance with distance from the light source, angle with respect to the light source, and point of view.

The peripheral device 103 performs interruption control, direct-memory-access (DMA) transfer control, etc. The main memory 104 is memory in which a program to be executed by the CPU 101 and data required to execute the program are stored. The structure of the main memory 104 and the stored data are described below. The OS-ROM 105 contains OS components for basic control of the game machine 52, such as the OS kernel and the boot loader.

The MDEC 106 decompresses compressed images. Specifically, the MDEC 106 decompresses the compressed image data of still pictures based on the joint photographic coding experts group (JPEG) and moving pictures based on the moving picture expert group (MPEG) by sequentially using decoding techniques based on Huffman coding, inverse quantization, inverse-discrete-cosine-transform computation, etc. The PIO 107 is an expansion port for parallel data, while the SIO 108 is an expansion port for serial data.

The GPU 109 is a subprocessor that can operate independently from the CPU 101. In accordance with a rendering instruction from the CPU 101, the GPU 109 performs the modeling and rendering of three-dimensional models composed of polygons, based on the coordinate data and color information determined by the GTE 102 and the CLUT and texture pattern data stored in the frame buffer 110. The GPU 109 generates two dimensional projection images of the area targeted for display in the virtual three dimensional space and stores it in the frame buffer 110.

In this context, the polygons are the minimum factors of figures constituting a three-dimensional model, and the minimum factors include polygonal planes such as triangles and quadrangles.

The GPU 109 also generates the picture signal, based on the stored image data or the image data transferred from the main memory 104, and supplies it to the monitor display 56.

Dual-port random access memory (RAM) can be used as the frame buffer 110. The frame buffer 10 has a rendering area and a display area. Image data sent from the GPU 109 to be rendered, or the Image data transferred from the main memory 104, are stored In the rendering area. Image data to be displayed on the monitor display 56 is stored in the display area. The rendering area and the display area are alternately switched by the GPU 109 in accordance with a field rate used for picture display.

In addition, the CLUT to be accessed for color selection, the texture pattern data for texture mapping, etc., can be stored in the frame buffer 110.

The SPU 111 is a subprocessor that can operate independently from the CPU 101. The SPU 111 reproduces sound in accordance with instructions from the CPU 101. In order to reproduce sound, the SPU 111 processes adaptive-differential-pulse-code-modulation (ADPCM) sound data by executing various appropriate modulations such as volume control, pitch conversion, interval control, envelope processing, and reverb processing. The SPU 111 performs reproduction to generate sound signals, and outputs the sound signals to the monitor display 56.

The SPU 111 also combines the reproduced audio data transferred from the CD-ROM decoder 114 with the sound data reproduced by the SPU 111 to generate sound signals, and outputs them to the monitor display 56.

The sound buffer 112 is a temporary memory for holding ADPCM sound data or the like transferred from the main memory 104 in accordance with instructions from the CPU 101. The sound buffer 112 can also be used as a work area for reverb processing by the SPU 111, or as a buffer memory for transferring the ADPCM sound data to the main memory 104.

The CD-ROM drive 113 can read encoded data stored in the CD-ROM 54 in order to drive and control the CD-ROM 54. The CD-ROM decoder 114 decodes the encoded data while performing error correction, and transfers program and data obtained by decoding, to the main memory 104 and the SPU 111. The CD-ROM drive 113 has audio-data-reproduction function since it includes an internal sound generator and mixer (not shown). The CD-ROM buffer 115 is a temporary memory for data to be transferred.

The controller 53 and the memory card 55 are connected to the communication device 116. The communication device 116 controls data transfer between the blocks of the game machine 52 and the controller 53 or the memory card 55, for example, the data transfer between the CPU 101 and the main memory 104.

The controller 53 is an input device operated by the player. By operating the controller 53, the player can input instructions to the game machine 52. The controller 53 transmits various operation signals in accordance with input by the player, to the game machine 52 via the communication device 116. The controller 53 is provided with input buttons such as a start button and directional keys. The memory card 55 includes a flash memory, and contains game data.

When the game machine 52 for example, displays an image or outputs sound, a large amount of image data and sound data must be transferred among the main memory 104, the frame buffer 110, the sound buffer 112, the CD-ROM buffer 115, and the MDEC 106. In order that high-speed data transfer may be achieved, the peripheral device 103 controls a so-called "DMA transfer" in which data can be directly transferred between two points without using the CPU 101.

In the first embodiment, various storage media such as the CD-ROM 54 and the main memory 104 function as a storage means. The CPU 101 functions as a setting means, an adjusting means, a time-measurement means, a time-adding means, a time-subtracting means, and a determination means. The CPU 101, the GTE 102, the GPU 109, the monitor display 56, etc., each have time-display means.

Next, the programs and data stored in the CD-ROM 54 are described. The programs and data are read from the CD-ROM 54 by the CPU 101, and are stored in the main memory 104.

Figure 3:
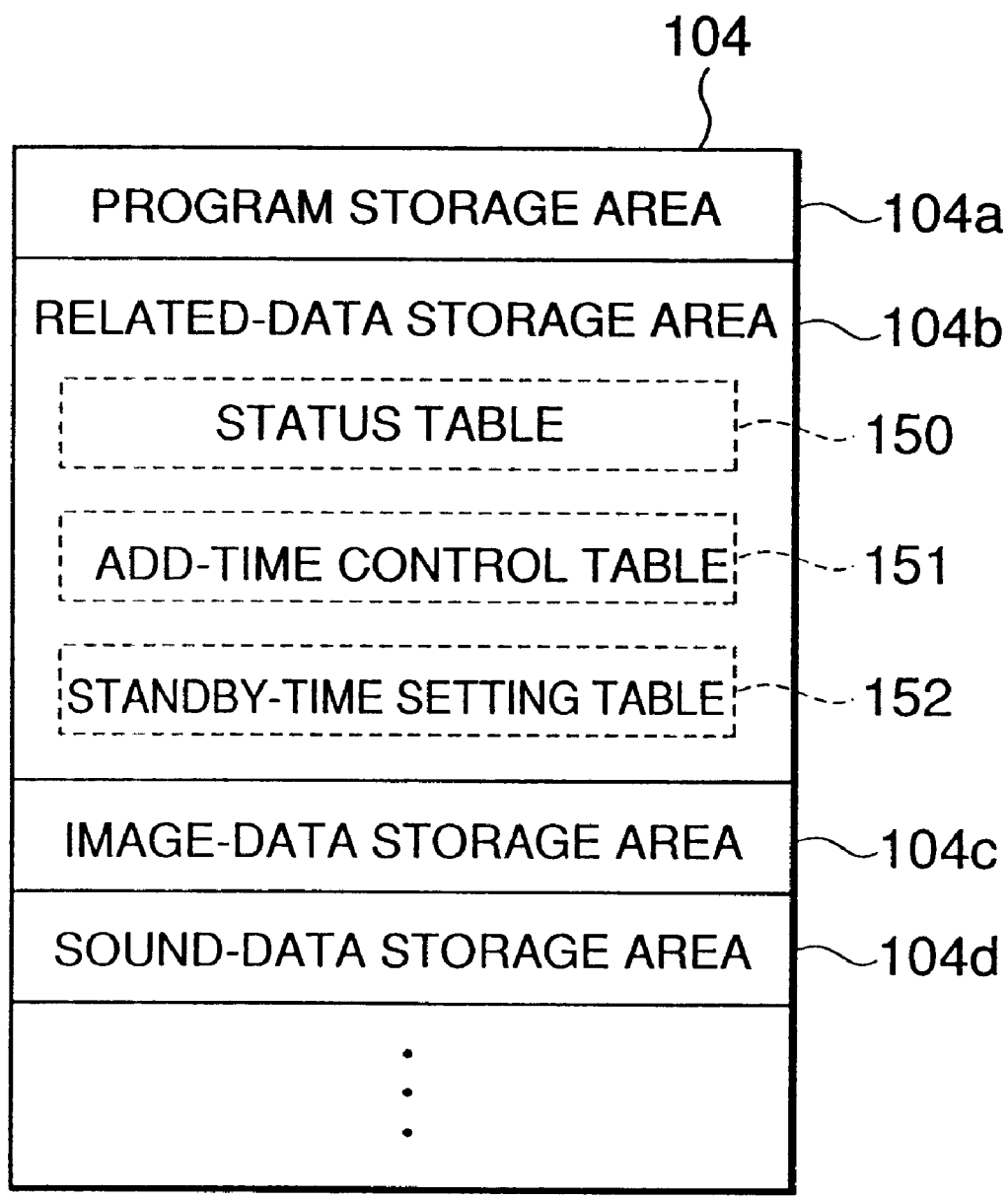
FIG. 3 is a drawing showing the structure of the main memory shown in FIG. 2.

FIG. 3 shows the structure of the main memory 104. As shown in FIG. 3, the main memory 104 includes a program storage area 104a, a related-data storage area 104b, an image-data storage area 104c, and a sound-data storage area 104d. Programs to be executed by the CPU 101 are stored in the program storage area 104a. Data necessary for executing various processes, such as a status table (described below) (cf., FIG. 4), an add-time control table (cf., FIG. 5), and a standby-time setting table (cf., FIG. 6) are stored in the related-data storage area 104b. Three-dimensional-model modeling data and two-dimensional-image data used as background, or image data related to a standby-time bar (described below) are stored in the image-data storage area 104c. Sound data such as for sound effects are stored in the sound-data storage area 104d.

Figure 4:
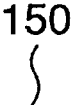
FIG. 4 is a status table stored in the related-data storage area shown in FIG. 3.

FIG. 4 shows the data structure of a status table 150. The status table 150 contains status information as to the player character. In other words, the status table 150 contains the following numerical data: the present "level" and "experience" value of the player character; ability values composed of "attack power", "defense power", "quickness", and "intelligence"; and information about the "items" the player character possesses. Each data of the status table 150 is stored in the related-data storage area 104b.

FIG. 5 shows the data structure of an add-time control table 151. In order that provision of permission for the enemy character to take an action in fighting may be controlled based on the time elapsed (measured time) from a predetermined reference time, such as the time the enemy character starts fighting or the time the player character starts fighting, the add-time control table 151 contains add-time data to be added to the measured time in accordance with execution timing for action by the player character. The add-time control table 151 corresponds to the player character. In the case where the development of the player character is divided into a plurality of levels, add-time data having a different value at each level can be stored in the add-time control table 151. Each data of the add-time control table 151 is stored in the related-data storage area 104b.

FIG. 6 shows the data structure of a standby-time setting table 152. The standby-time setting table 152 includes time data (standby-time data) for each enemy character which must be measured from the predetermined reference time in order to permit each enemy character to execute an action. The standby-time setting table 152 is stored in the related-data storage area 104b.

Before describing the add-time data and the standby-time data, an outline of a game realized in the game system 51 and an outline of the standby-time bar are sequentially described.

In the game, a player controls a player character to search in a dungeon, whereby the player character finds a treasure hidden somewhere in the dungeon. While the player character is searching, the player character successively fights with enemy characters wandering in the dungeon. When the player character experiences fights with enemy characters, his level and each ability value is gradually increased.

In the game, an encounter of the player character with one enemy character may cause a fight. Accordingly, in the game in the first embodiment, the game machine 52 is designed so that the player character can execute an action such as an attacking, a defending, using an item, or moving at the desired timing. The game machine 52 is also designed so that the enemy character can be permitted to execute one action when the measured time from the predetermined reference time is greater than a preset period (one standby period), or a new measured time, obtained by using a certain arithmetical operation to adjust the above measured time, is greater than the predetermined period (one standby period).

In the game in the first embodiment, when the player character executes one action at the desired timing, in accordance with the execution timing for the player character, the predetermined-time value is added to the measured time for permitting the execution of an action by the enemy character. By comparing the measured time for the enemy character, which is adjusted by the above-described addition, with the standby time, it is determined whether the enemy character is permitted to execute an action. The predetermined-time value to be added is determined by using one predetermined standby time as a reference value on the assumption that when the one predetermined standby time elapses, the player character is permitted to execute one action the same as the enemy character. However, the predetermined-time value to be added to the measured time for the enemy character is not limited to the value set as described above.

Accordingly, if the game machine 52 is designed to control the game so that the player character is permitted to execute one action at the desired timing, in accordance with the execution timing, then the necessary standby time of the player character is added to the measured time for the enemy character. Thus, execution permissions for actions by all the characters, including the player character, are effectively controlled with the elapsed fighting time used.

The design of the game machine 52 for performing the above-described control enables the player character to execute an action at the desired timing, which eliminates the need for the standby-time bar or the player character. Thus, only the standby-time bar for the enemy character is displayed during the fight.

FIGS. 7A to 7D show outlines of a standby-time bar 200. The standby-time bars 200 shown in FIGS. 7A to 7D are displayed on the monitor display 56. Accordingly, the standby-time bar 200 enables the player to visually recognize the time remaining (time-measurement condition) until the execution of one action is permitted. The overall length of the standby-time bar 200 indicates a total time value required until the enemy character is permitted to executed one action. A time-measurement bar 200a in the standby-time bar 200 indicates the elapsed time from a predetermined reference point, namely, the present time-measurement condition. The length of the time-measurement bar 200a (hatching area) gradually increases as the already measured time value increases to the right, as shown in FIGS. 7A to 7D.

Figure 7A:
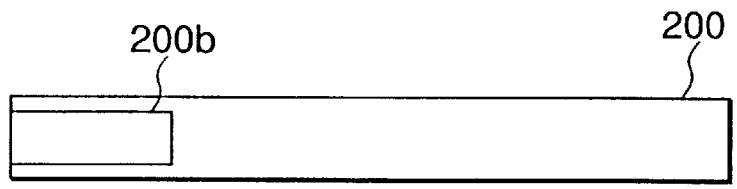
FIGS. 7A to 7D are drawings showing an outline of a standby-time bar according to the first embodiment of the present invention.
Figure 7B:
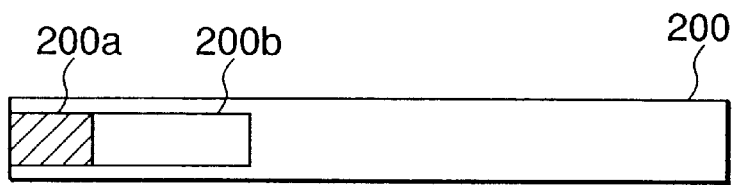
Figure 7C:
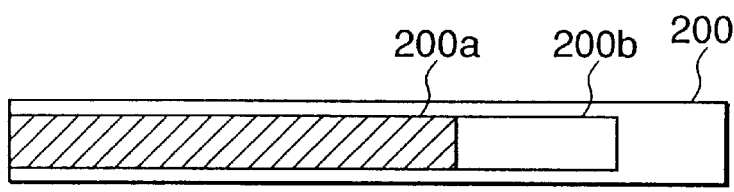
Figure 7D:
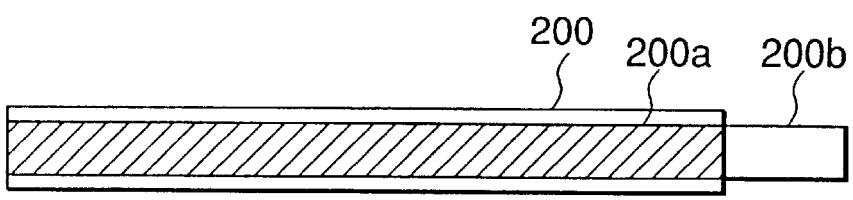

As shown in FIG. 7D, when the time-measurement bar 200a reaches the overall length of the standby-time bar 200, the enemy character is permitted to execute one action. One action executed by the enemy character resets the time-measurement bar 200a, namely, the measured time, and the time-measurement bar 200a returns to the condition shown in FIG. 7A. At this time, time measurement, and processing for displaying the time-measurement bar 200a in accordance with a measured time obtained by the time measurement, are performed again from a value of zero.

The add-time indication bar 200b at the head of the time-measurement bar 200a is shown in FIGS. 7A to 7D. The add-time indication bar 200b indicates a time value to be added to the measured time for the enemy character in accordance with timing for the player character to execute one action. In other words, when the player character executes one action, the length of the time-measurement bar 200a increases by the length of the add-time indication bar 200b at the moment the player character executes an action. When the standby time for the enemy character is measured, the add-time indication bar 200b is always displayed at the head of the time-measurement bar 200a, as shown in FIGS. 7A to 7D.

Information indicated by the standby-time bar 200 enables the player to see, at a glance, information about the remaining time until the enemy character is allowed to execute an action. In addition, when the player sends an instruction for the player character to execute an action, the information indicated by the standby-time bar 200 enables the player character to recognize, at a glance, information about whether the that action will cause the enemy character to be able to execute an action.

Referring back to FIG. 5. each add-time data in the add-time control table 151 represents a time value to be added to the measured time for the enemy character at the moment when the player character executes one action. Each add-time data in the add-time control table 151 can also be used as data for determining the overall length of the add-time Indication bar 200b.

The value of the add-time data of the add-time control table 151 is specifically described below. In the add-time control table 151, the development of the player character is divided into a plurality of levels. Each add-time data having a different value at each level is stored. In the add-time control table 151, the value of add-time data decreases as the level of the player character increases. Accordingly, when the player character executes an action, the time value added to the measured time for the enemy character decreases as the level of the player character increases. Thus, the player character can more advantageously display improved fighting skills as its level increases.

Based on the value of the add-time data, the length of the add-time indication bar displayed on the screen changes. Accordingly, the player can also recognize the level-up and growth of the player character by watching the length of the add-time indication bar displayed on the screen during the battle.

In FIG. 6, each standby-time data of the standby-time setting table 152 represents a total time value necessary for permitting the enemy character to executing one action. Each standby-time data of the standby-time setting table 152 can be used also for determining the overall length of the standby-time bar 200.

As described above, the game machine 52 is designed or controlled so that a player character can execute an action at the desired timing, and so that an enemy character can basically be permitted to execute one action in accordance with the passage of one standby time. When the player character executes an action, the time value in accordance with the standby time required for the player character to act is added to the measured time for the enemy character. By comparing the measured time, which is adjusted by addition, to a standby time for the enemy character, it is determined whether the enemy character is permitted to act. By using this technique, permission to execute actions by all characters including the player character can be effectively controlled with the elapsed fighting time used.

Accordingly, it is not necessary for the player to wait for the player character to execute an action, which enables elimination of a required fighting time. This can reduce redundancy in the progress of the game. Thus, while playing the game, the player can experience stronger tension in fighting scenes.

Next, the control process performed by the game system 51 in the first embodiment is described. In order that the following description may be easily understood, the following description is based on the following points: processing by the CPU 101 includes processing by the GTE 102 in practice; and, under the control of the CPU 101, in practice, the processing program is sequentially read from the CD-ROM 54 in accordance with the progress of processing, and is transferred to the main memory 104. The following description omits details about the reading of the processing program from the CD-ROM 54 and the transfer of the processing program to the main memory 104. In addition, for simplicity, the following control process is described about a case in which one player character fights with one enemy character. The number of player characters or the number of enemy characters can be increased by similarly processing a character to be added.

When playing the game, the player pushes the open button 62 to open the disc holder 61, and loads the CD-ROM 54 into the CD-ROM drive 113 before closing the disc holder 61. In this state, when the player presses the power button 63, or presses the reset button 64 if the power button 63 is switched on, the CPU 101 performs a predetermined activation sequence before initiating a main process shown in FIG. 8.

FIG. 8 shows a flowchart of the main process. Initially, the CPU 101 executes a program for opening processing.

The CPU 101 uses the GPU 109 to display predetermined images, and uses the SPU 111 to output predetermined sounds, whereby opening pictures and corresponding sounds are output from the monitor display 56 (step S101). The CPU 101 determines whether the start button on the controller 53 has been pressed (step S102).

If the CPU 101 has determined that the start button has not been pressed ("No" in step S102), it repeatedly performs steps S101 and S102 to monitor the start button. At the same time, the CPU 101 sends an instruction to the GPU 109 and the SPU 111 to continuously output the opening picture and corresponding sound from the monitor display 56. Steps S101 and S102 are repeatedly performed until the CPU 101 determines that the start button has been pressed.

When the CPU 101 has determined that the start button was pressed ("Yes" in step S102), it executes the initial processes necessary to start the game, such as reading saved data from the memory card 55, setting game environments based on that data, and displaying game images (step S103). The CPU 101 then starts the game (step S104).

The CPU 101 displays images and outputs sound in accordance with the progress of the game. The CPU 101 monitors operation input sent from the controller 53, and determines whether a player has input a moving instruction by pressing a directional key (step S105).

If the CPU 101 has determined that no moving instruction was input ("No" in step S105), it executes other processing in accordance with operation input from the controller 53, such as equipping the player character with weapons and armor, or saving data to the memory card 55 (step S106). The CPU 101 then returns to step S105.

If the communication program has determined that the moving instruction was input, it executes movement of the player character in accordance with the directional keys, and changes the point of view with the movement of the player character (step S107). Based on positional information about the player character and the enemy character, the CPU 101 determines whether the player character has encountered an enemy character (step S108).

If the CPU 101 has determined that the player character has not encountered the enemy character ("No" in step S108), the CPU 101 returns to step S105, in which it monitors the controller 53. If the CPU 101 has determined that the player character encountered an enemy character ("Yes" in step S108), the CPU 101 transfers from the opening process to the battle-mode process (shown in FIGS. 9 and 10) described below (step S109), in which the CPU 101 controls the battle between the player character and the enemy character.

When the battle-mode process terminates, the CPU 101 reads the status table 150 (shown in FIG. 4) stored in the related-data storage area 104b in the main memory 104, and obtains the experience value of the player character updated by a battle against the enemy character.

Based on the new experience value of the player character, the CPU 101 determines whether there is an increase in the level of the player character.

If the CPU 101 has determined that there has been an increase in the level of the player character, the CPU 101 causes the level data in the status table 150 to increment by +1, and executes level raising. The level raising includes the increasing of each ability value at a predetermined rate. After increasing the level (step S110), the CPU 101 returns to step S105.

When a game-termination instruction is input from the controller 53, the CPU 101 executes processing related to the termination of the game in step S106. After performing step S106, the CPU 101 terminates the main processing, without returning to step S105. When the power button 63 or the reset button 64 is pressed in the middle of the game, the CPU 101 executes an interruption to forcibly terminate the main processing.

Figure 9:
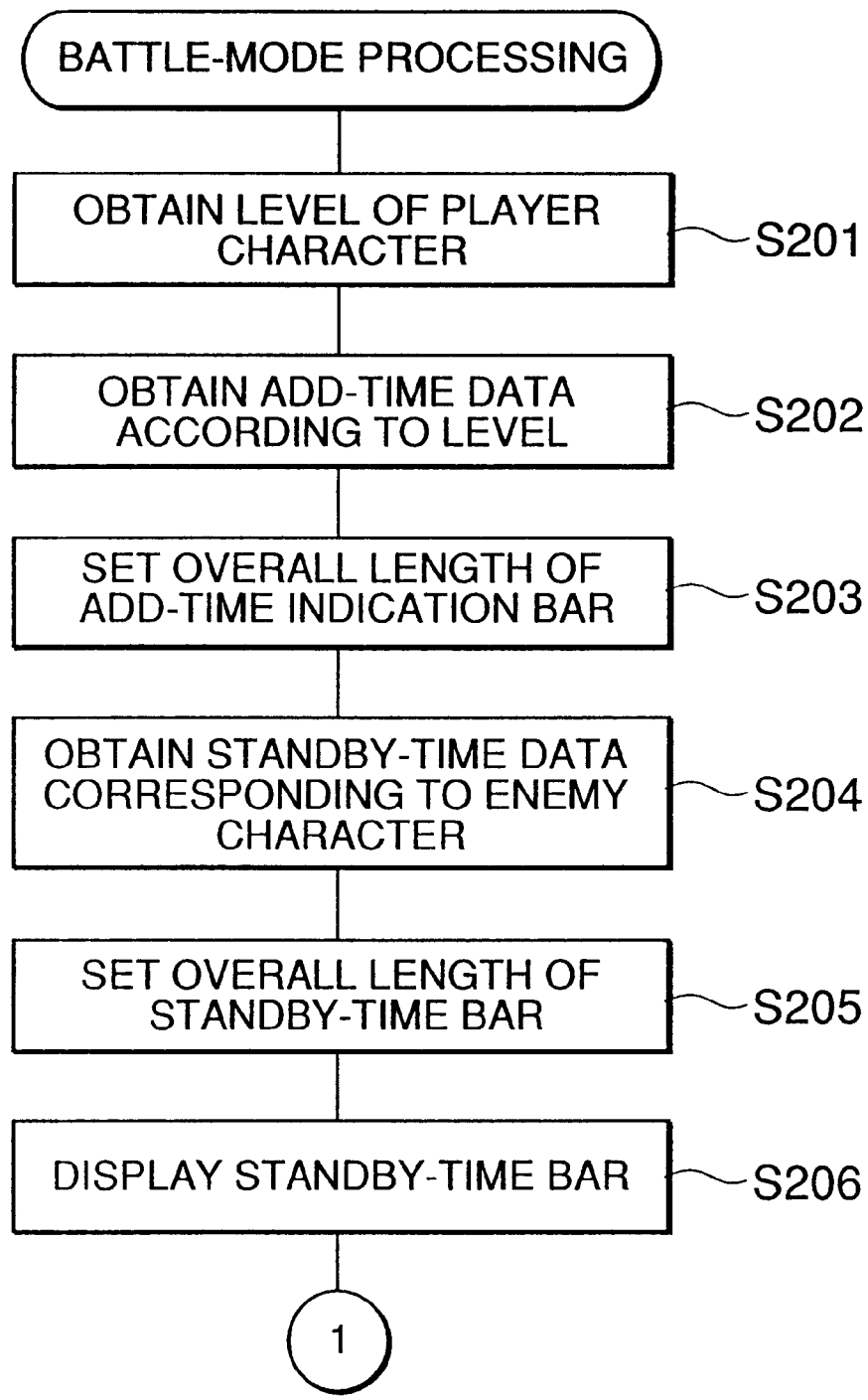
FIG. 9 is a first flowchart showing a battle-mode process executed as a subroutine in the main process shown in FIG. 8.
Figure 10:
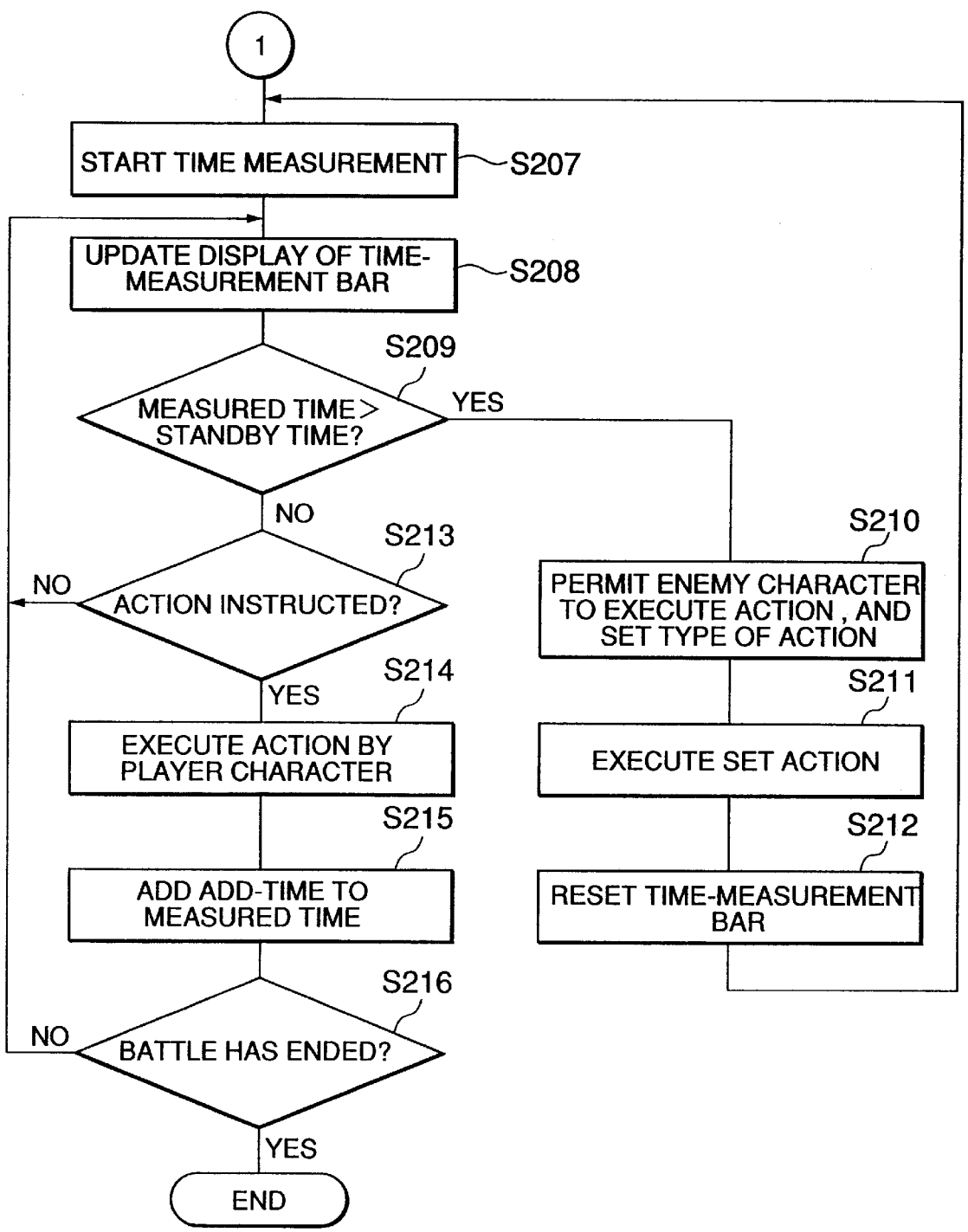
FIG. 10 is a second flowchart showing a battle-mode process executed as a subroutine in the main process shown in FIG. 8.

Next, the battle-mode process executed as a subroutine in the above-described main processing (shown in FIG. 8) is described. FIGS. 9 and 10 are flowcharts showing the battle-mode process.

Initially, the CPU 101 obtains the present level of the player character from the status table 150 (shown in FIG. 4) stored in the related-data storage area 104b in the main memory 104 (step S201). Based on the present level, the CPU 101 obtains corresponding add-time data from the add-time control table 151 (shown in FIG. 5) stored in the related-data storage area 104b (step S202).

The CPU 101 sets the obtained add-time data as an add-time value to be added to a measured time for the enemy character when the player character executes an action. Based on the add-time value, the CPU 101 sets the overall length of the add-time indication bar 200b (step S203).

The CPU 101 obtains standby-time data corresponding to the enemy character as a target, from the standby-time setting table 152 (shown in FIG. 6) stored in the related-data storage area 104b (step S204). The CPU 101 sets the standby-time data as standby time required for the enemy character to execute one action. Based on the standby time, the CPU 101 sets the overall length of the standby-time bar 200 (step S205).

Figure 11:
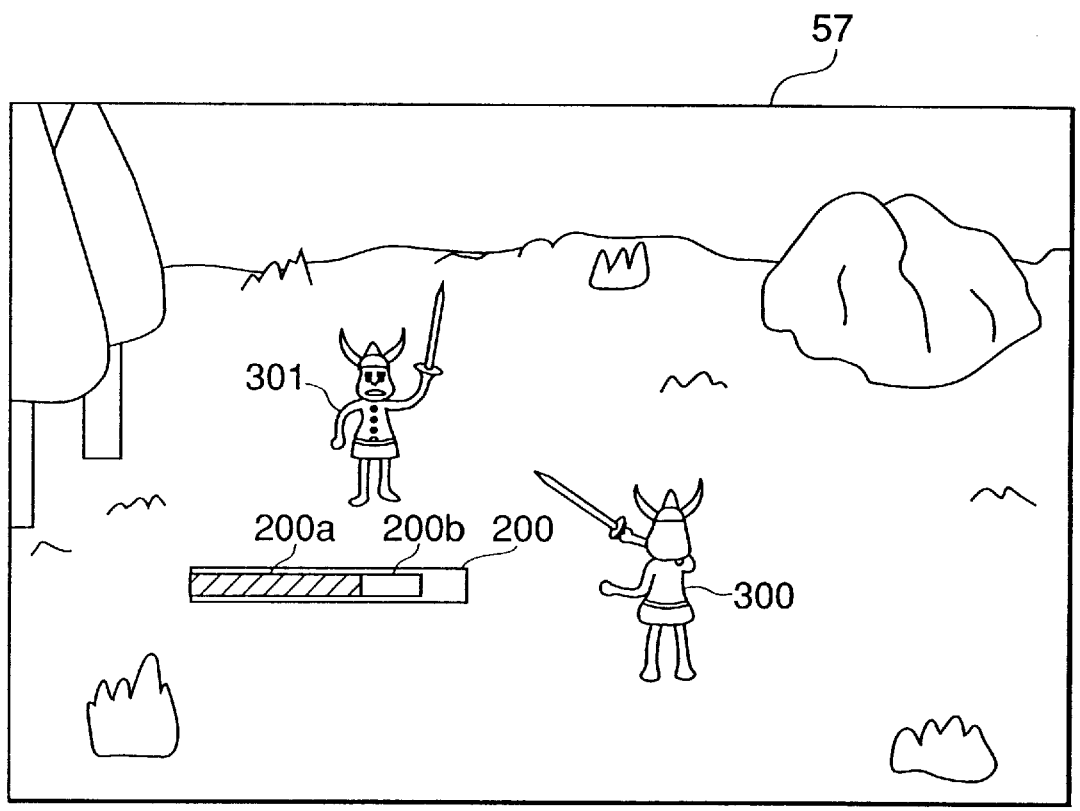
FIG. 11 is a drawing showing a screen displayed in a game according to the first embodiment of the present invention.

The CPU 101 reads image data related to the standby-time bar 200, from the image-data storage area 104c in the main memory 104, and transfers them to the GPU 109. Subsequently, the CPU 101 sends an instruction for the GPU 109 to display the standby-time bar 200. In accordance with the instruction, GPU 109 displays the standby-time bar 200 beside an enemy character 301 in a fighting scene as shown in FIG. 11 (step S206). FIG. 11 shows a screen appearing when fighting in the game is performed in the first embodiment. In this screen, a player character 300, the enemy character 301, and the standby-time bar 200 beside the enemy character 301, are displayed.

The CPU 101 starts measuring a time for the standby time (step S207). The measurement is performed such that the built-in timer counter of the CPU 101 counts the number of clock pulses. Basically, based on the measured time, the CPU 101 uses the GPU 109 to update the display of the time-measurement bar 200a (step S208). Accordingly, as time elapses, the time-measurement bar 200a gradually lengthens to the right in accordance with the measured standby time.

Part of the above-described successive processes in steps S204 to S207 corresponds to a means for setting execution timing at which the enemy character 301 executes an action, as shown below. The part is composed of step S204 in which the standby time corresponding to the enemy character 301 as a target is obtained from the standby-time setting table 152, and step S207 in which the obtained standby time starts to be measured from a predetermined reference point, for example, at the start of the fight, or when the player character executes an action.

Next, the CPU 101 determines whether the time-measurement bar 200a reaches the overall length of the standby-time bar 200, that is, whether the measured time reaches the standby time (step S209). If the CPU 101 has determined that the measured time has reached the standby time ("Yes" in step S209), the CPU 101 permits the enemy character 301 to execute one action, and determines the type of action in accordance with the condition of fighting (step S210). Based on the determined type of the action by the enemy character 301, the CPU 101 uses the GPU 109, the SPU 111, etc., to appropriately perform necessary arithmetical operations for fighting, graphics processing, and sound processing. As a result the action by the enemy character 301 is executed on the display screen (step S211).

Once the action by the enemy character 301 has been executed, the CPU 101 resets the measured time and the overall length of the time-measurement bar 200a to zero (step S212) before returning to step S207. The CPU 101 displays the time-measurement bar 200a updated in accordance with the time measurement for the standby time and the measured time.

In addition, in step S209, if the CPU 101 has determined that the measured time is less than the standby time ("No" in step S209), the CPU 101 monitors operation input from the controller 53, and determines whether an action instruction from the player to the player character 300 has been input (step S213).

If the CPU 101 has determined that no action instruction to the player character 300 is input ("No" in step S213), the CPU 101 returns to step S208. If the CPU 101 has determined that an action instruction to the player character 300 is input ("Yes" in step S213), the CPU 101 sends instructions for the GPU 109, the SPU 111, etc., to appropriately perform graphics processing, sound processing, and arithmetical operations necessary for fighting. As a result, the action by the player character 300 is executed on the display screen (step S214).

Subsequently, the CPU 101 adds, to the measured time for the enemy character 301, a time corresponding to the length of the add-time indication bar 200b at the head of the time-measurement bar 200a, that is, the add-time data obtained in step S202, whereby the measured time is adjusted (step S215).

As described above, the measured time for the enemy character 301 is basically based on a value obtained by the built-in timer counter, and the measured time is adjusted such that an add-time data is added to the measured time in accordance with the input action Instruction to the player character 300. The measured time adjusted by the addition is further updated by the timer counter value.

Part of the successive processes in steps S213 to S215 described above corresponds to processing for adjusting action timing set for the enemy character 301 in accordance with an instruction related to action by the player character 300, or processing for adjusting a time set for the enemy character 301, which executes an action after a preset time elapses, in accordance with an instruction related to the next action by the player character 300. This part corresponds to step S213 in which input generated by the player operating the controller 53 is monitored to determine whether an instruction related to the next action by the player character 300 is input by the player, and step S215 in which when an instruction related to the next action by the player character 300 is input by the player, the measured time is adjusted by adding the data obtained beforehand in step S202, to the measured time.

The CPU 101 determines whether the battle between the player character 300 and the enemy character 301 has ended (step S216). Specifically, the CPU 101 makes the determination based on whether one of the strength values set for the player character 300 or the enemy character 301 has decreased to zero, or whether the player character 300 is instructed to act to avoid fighting.

If the CPU 101 has determined that the battle has not yet ended ("No" in step S216), the CPU 101 returns to step S208. If the CPU 101 has determined that the battle has already ended ("yes" in step S214), the CPU 101 terminates the battle-mode process before proceeding back to step S110 in the main process (shown in FIG. 8).

By controlling the display of the standby-time bar 200, the duration the enemy character 301 must wait until it is permitted to execute an action, or if the player character 300 is instructed to execute an action at the present time, to what extent changes are given by the action until the enemy character 301 is permitted to execute an action, can be recognized at a glance with a graphical display of the standby-time bar 200. After the player decides his course of action, based on his understanding of the timing, the player can control the player character 300 to fight with the enemy character 301.

By controlling the player character 300 as described above, the need for a dead time in which the player must wait for the player character 300 to execute an action is eliminated, which can eliminate a fighting time required for the dead time. This can reduce redundancy in the progress of the game. Accordingly, the progress of the game is rapid. As a result, the player can experience stronger tension in fighting scenes.

In the case where there are several enemy characters 301 with which the player character 300 should fight, standby-time bars 200 for the respective enemy characters 301 are displayed. When the player character 300 executes an action, in accordance with the execution timing, the add-time data is added to a measured time for each enemy character 301.

When there are several enemy characters to fight with, the following effect is accomplished according to the standby-time bar displayed per enemy character. Specifically, the player can recognize from the standby-time bars which of the enemy characters is in an action executable state. Therefore, it is possible to keep a distance from the enemy character which is in the action executable state so as to reduce a damage to be received upon being attacked. Further, in such an event, it is possible to find an enemy character which does not come into the action executable state even if the player character executes an action next and to attack that enemy character.

As described above, when fighting with several enemy characters, the standby-time bar becomes an important judging factor for deciding a strategy, as compared with a case wherein the player character fights with one enemy character.

In the game machine 52 according to the present invention, a single player can control several player characters 300. In such a case, the player controls each player character 300 to execute an action at the desired timing. By employing the control, if the player sends an instruction to an arbitrary player character 300, the measured time for each enemy character 301 can be adjusted as described above in accordance with the instruction related to action by the arbitrary player character 300.

In the above-described first embodiment, the level of the player character is selected so that the add-time data can be optimal in order that the player may enjoy proceeding with the game. However, concerning the add-time data, in addition to the level of the player character, the following various factors can be selected: each ability value set for the player character; the use of outfit items such as weapons and armor; the use of a particular item; and the progress of the game; namely, predetermined conditions established in the game. The add-time data can be changed in accordance with the predetermined conditions by controlling or forming the game machine 52.

Concerning techniques for using arithmetical operations to adjust the measured time for the enemy character, it is possible for the measured time to be increased at a predetermined rate, in addition to the addition of a predetermined add-time data to the measured time for the enemy character at the time the player character executes an action.

Second Embodiment

In the game machine 52 according to the first embodiment of the present invention, a standby time required for an enemy character 301 to execute one action is fixed, and in accordance with the execution of one action by the player character 300, the predetermined time value is added to a measured time for the enemy character 301. Conversely, in the game machine 52 according to the second embodiment of the present invention, without adjusting the measured time for an enemy character 301, by subtracting a predetermined time value from the. standby time for the enemy character 301 in accordance with an action executed by a player character 300, advantages similar to those in the first embodiment can be obtained.

In the game machine 52 according to the second embodiment, the hardware and the game control process are almost identical to those described in the first embodiment. Accordingly, only the differences from the first embodiment are described.

FIG. 12 shows a subtraction-time control table 153. The subtraction-time control table 153 contains subtraction data to be subtracted in accordance with timing for the execution of actions by the player character 300, from a standby time required for the enemy character 301 to execute one action in the case where action-executing permission given to the enemy character 301 is controlled based on elapsed time. The subtraction-time control table 153 corresponding to the player character 300. In a game where the development of the player character 300 is divided into several levels, different subtraction-time data for the respective levels is stored in the subtraction-time control table 153. The subtraction-time data of the subtraction-time control table 153 is stored in the related-data storage area 104b.

Figure 13:
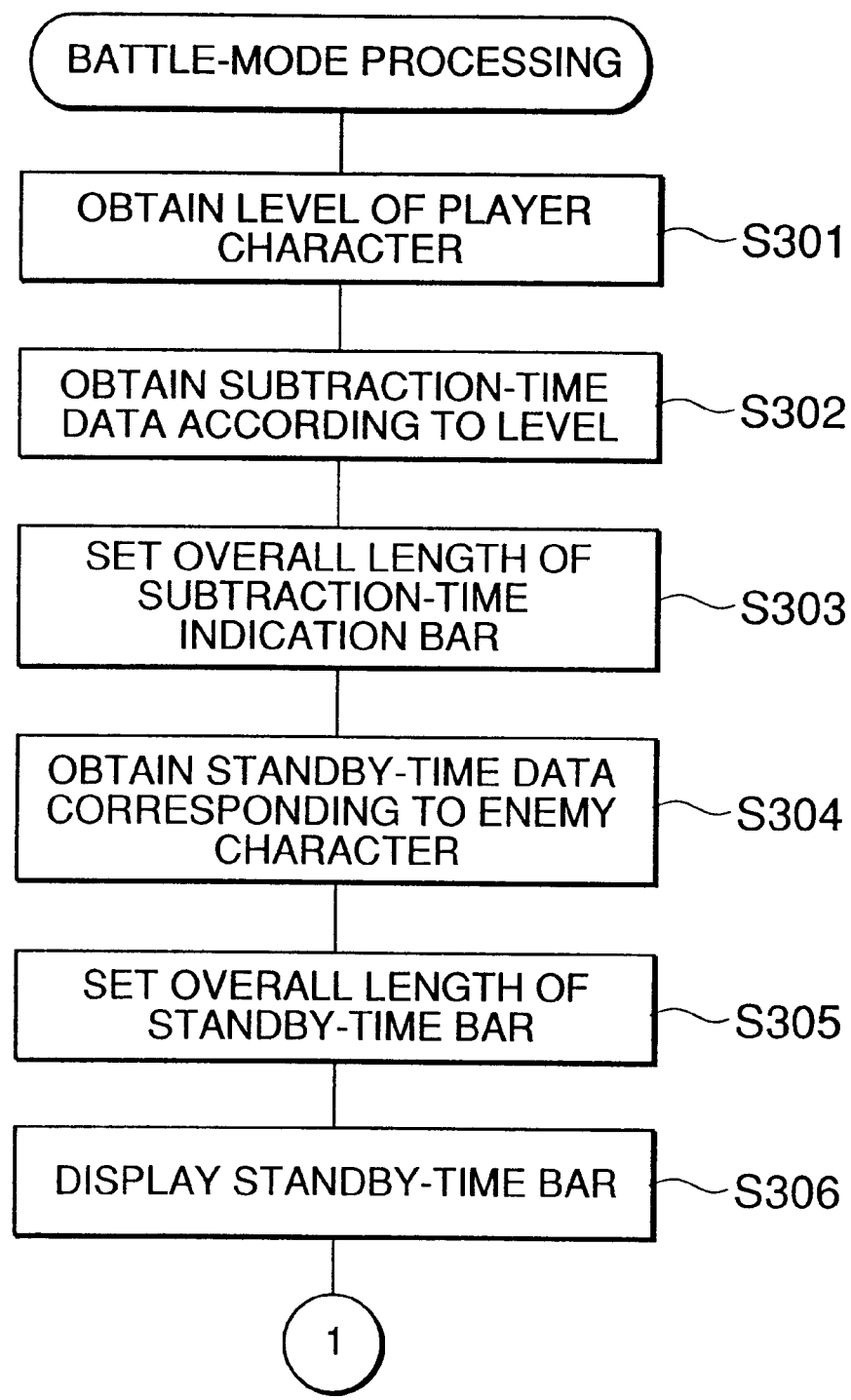
FIG. 13 is a first flowchart showing a battle-mode process according to the second embodiment of the present invention.
Figure 14:
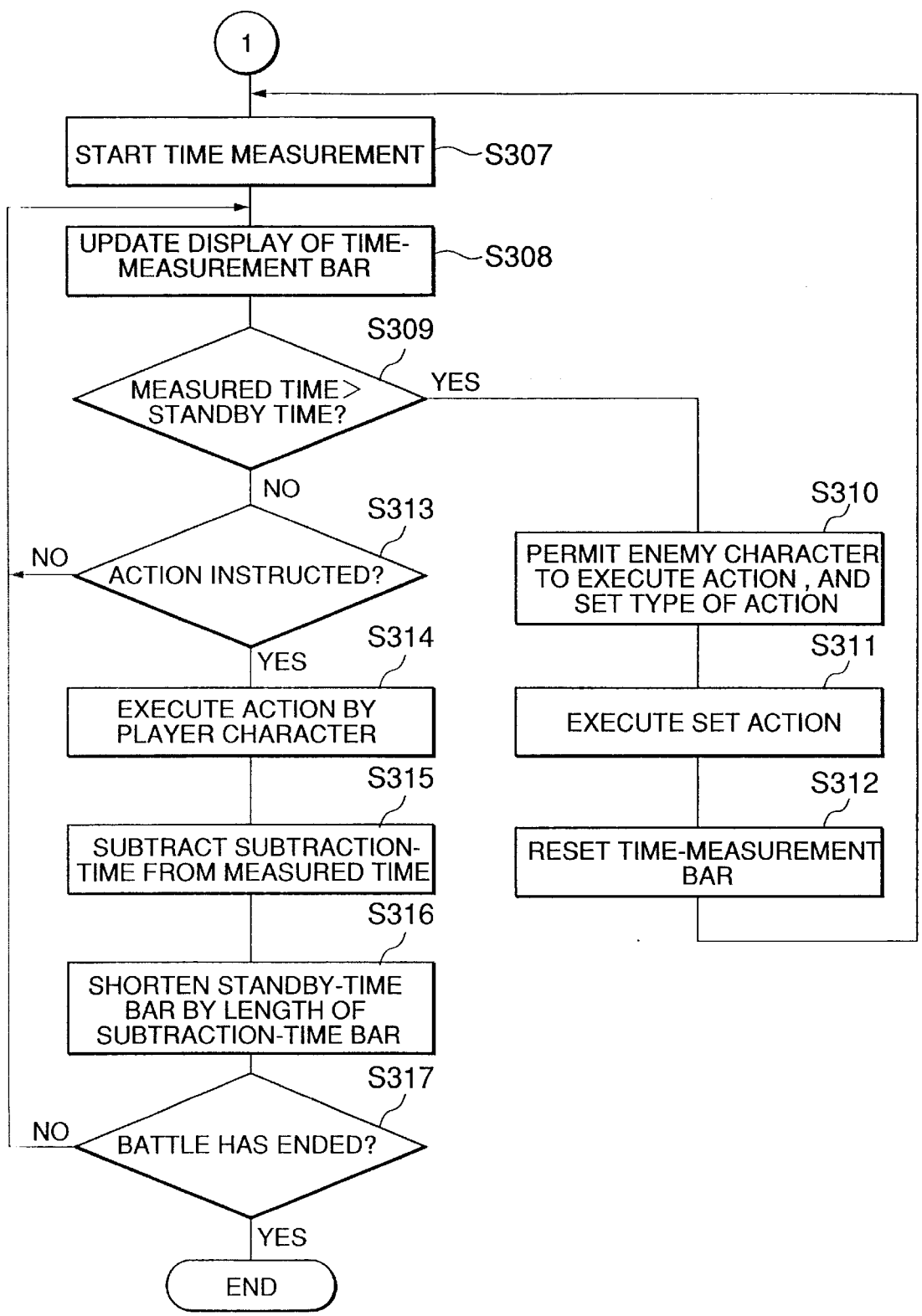
FIG. 14 is a second flowchart showing a battle-mode process according to the second embodiment of the present invention.

Next, concerning the process for controlling the game in the second embodiment, only the differences from the first embodiment are described. FIGS. 13 and 14 show a flow-chart of a battle-mode process in the second embodiment, and correspond to FIGS. 9 and 10 In the first embodiment, respectively.

The CPU 101 receives, based on the level of the player character 300 received in step S301, the corresponding subtraction-time data from the subtraction-time control table 153 (shown in FIG. 12) stored in the related-data storage area 104b (step S302).

The CPU 101 uses this subtraction-time data as the subtraction time to be subtracted from the standby time for the enemy character 301 when the player character 300 executes an action. The CPU 101 sets the overall length of the subtraction-time indication bar, based on the subtraction time (step S303).

Subsequently, steps S304 to S314 are performed similarly to corresponding steps S204 to S214 described in the first embodiment. Accordingly, a description of steps S304 to S314 is omitted. After executing actions by the player character 300 in accordance with action instructions from the player in step S314, the CPU 101 subtracts the subtraction-time data received in step S302, from the standby-time data received in step S304 (step S315). As a result, the standby time is reset to be less by the amount of the subtraction-time data.

The CPU 101 updates the display of a standby-time bar 210 to be shorter by a length corresponding to a subtraction-time indication bar 210b positioned at the right end of the standby-time bar 210, as shown in FIGS. 15A to 15D (step S316). The CPU 101 then determines whether fighting terminates (step S317). In accordance with the determination, the flow of the game control process shown in FIG. 14 is branched into a return to step S308 and termination of the battle-mode process.

Figure 15A:
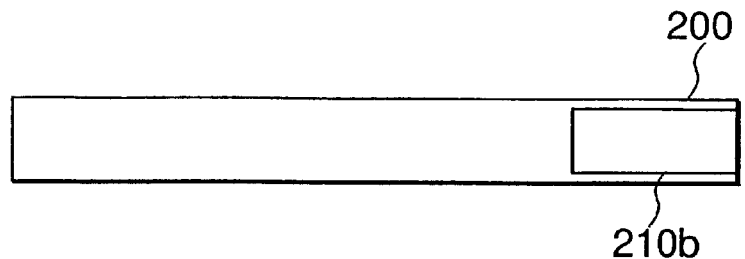
FIGS. 15A to 15D are drawings showing an outline of a standby-time bar according to the second embodiment of the present invention.
Figure 15B:
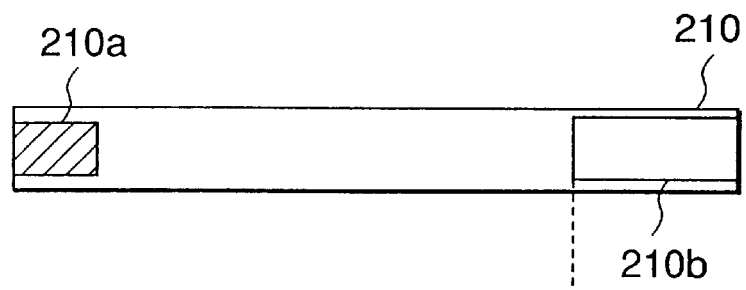
Figure 15C:
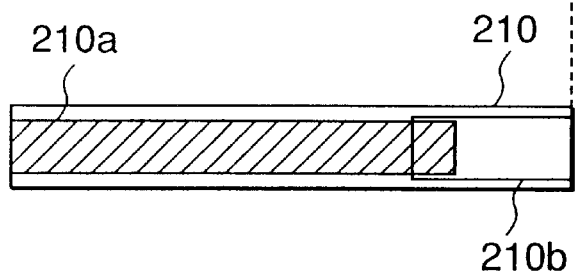
Figure 15D:
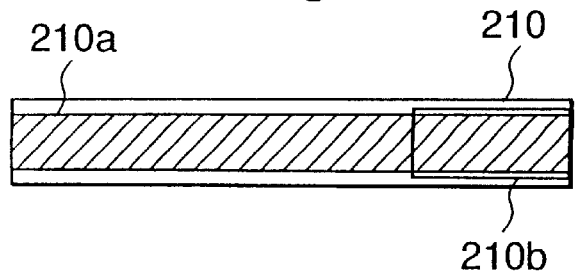

FIGS. 15A to 15D show an outline of the standby-time bar 210 according to the second embodiment. Time elapses in the order of FIG. 15A to FIG. 15D. The overall length of the standby-time bar 210 indicates a total time required to permit the enemy character 301 to execute one action. A time-measurement bar 210a indicates a time (measurement condition) that has been measured to the present time, and gradually lengthens to the right in accordance with the measured time as shown in FIGS. 15A to 15D. When the time-measurement bar 210a reaches the overall length of the stand by-time bar 210 (as shown in FIG. 15D), the enemy character 301 is permitted to execute one action.

When the enemy character 301 executes one action, the time-measurement bar 210a returns to the condition shown in FIG. 15A, in other words, the measured time is reset. The time measurement restarts from a value of zero, and the time-measurement bar 210a is displayed in accordance with the measured time.

The subtraction-time indication bar 210b in the right of the standby-time bar 210 indicates the time to be subtracted from the standby time in accordance with timing at which the player character 300 executed one action. In other words, in accordance with the execution timing of the player character 300, the standby-time bar 210 is displayed to be shorter by a length corresponding to the length of the subtraction-time indication bar 210b. In display examples of the standby-time bar 210 shown in FIGS. 15A to 15D, one action by the player character 300 is executed between the time shown in FIG. 15B and the time shown in FIG. 15C. Accordingly, the standby-time bar 210 is shortened by a length corresponding to the length of the subtraction-time indication bar 210b. The subtraction-time indication bar 210b is always positioned from one end in the standby-time bar 210. In the display examples of the standby-time bar 210 shown in FIGS. 15A to 15D, the subtraction-time indication bar 210b is positioned from one end, for example, the right end in the standby-time bar 210.

As described above, by controlling the display of the standby-time bar 210, the player views the standby-time bar 210, thereby seeing at a glance information in the graphical display, such as how much time remains until the enemy character 301 can execute an action and whether an action by the player character 301 will result in giving the enemy character 301 permission to execute an action. After the player decides his course of action, based on his understanding of the timing, the player can control the player character 300 to fight with the enemy character 301.

Also, in the second embodiment, the need for the player to wait for the player character 300 to execute an action is eliminated. This can reduce redundancy in the progress of the game. Accordingly, the progress of the game is rapid. As a result, the player can experience stronger tension in fighting scenes.

Concerning techniques for using arithmetical operations to adjust the standby time for the enemy character 301, it is possible for the standby time to be reduced at a predetermined rate, in addition to the subtraction of a predetermined subtraction time from the standby time for the enemy character 301 in accordance with the execution of action by the player character 300.

The standby-time bar 210 is not limited to each graph-display form shown in FIGS. 7A to 7D, and FIGS. 15A to 15D; for example, each form in FIGS. 16A to 16D may also be employed. The functions of the standby-time bars and standby-time timers shown in FIGS. 16A to 16D are similar to those described in the first and second embodiments; Accordingly, only the characteristic points of the standby-time bars and standby-time timers are described below.

Figure 16A:
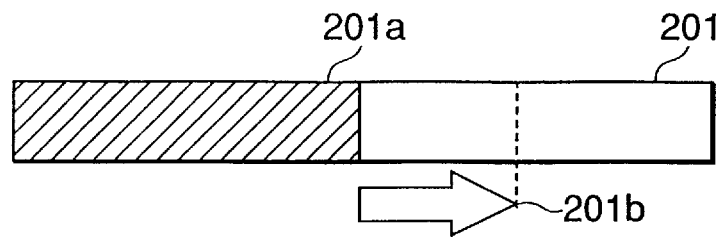
FIGS. 16A to 16D are drawings showing modifications of a standby-time bar according to the second embodiment of the present invention.
Figure 16B:
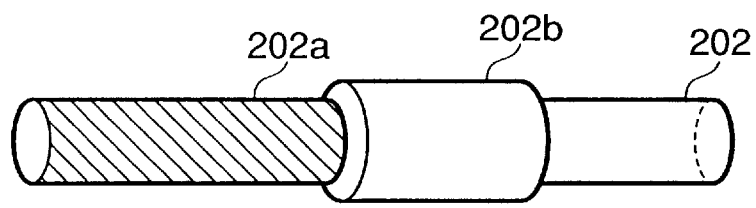
Figure 16C:
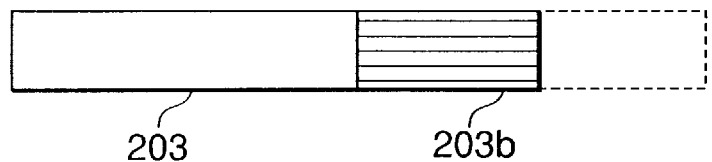
Figure 16D:
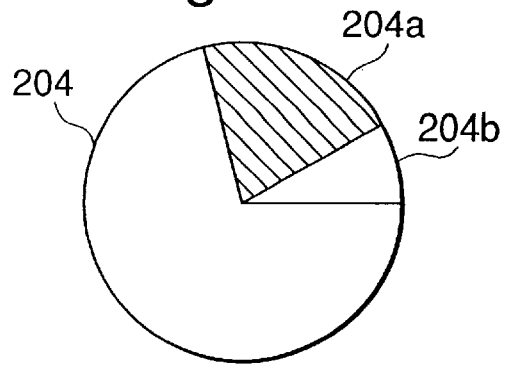

As shown in FIG. 16A, below the standby-time bar 201, an add-time indication bar 201b in the form of an arrow is provided. As shown in FIG. 16B, the standby-time bar 202 is displayed in the form of a tube. In FIG. 16C, as the measured time increases, the standby-time bar 203 shortens to the left. When the player character 300 executes one action, the standby-time bar 203 shortens by a length corresponding to the length of a subtraction-time indication bar 203b in accordance with timing for the execution of one action. When the standby-time bar 203 reaches zero, the enemy character 301 is permitted to execute one action.

Instead of the standby-time bar 201, 202, or 203, a standby-time bar 204 in the form of a pie graph may be used. In the standby-time bar 204, the add-time indication area 204b functions the same as the add-time indication bar 201b.

In the foregoing first and second embodiments, the timing of permitting execution of an action by the fighting enemy character is controlled in the following manner. Specifically, when the player character executes one action, the predetermined time is added to or subtracted from the measured time for the fighting enemy character. Then, when the measured time reaches one predetermined standby time, the enemy character is permitted to execute one action.

However, the timing of permitting execution of an action by the enemy character may be controlled in the following manner, for example.

Specifically, similar to the foregoing first and second embodiments, one standby time for permitting execution of an action is set to an enemy character. However, a time is not measured for permitting execution of an action by the enemy character.

Specifically, when the player character executes one action, a predetermined time is added to an accumulated time for the fighting enemy character. An initial value of the accumulated time is set to zero. Then, when the accumulated time reaches the foregoing standby time, the enemy character is permitted to execute one action. In this case, the accumulated time is kept constant unless the predetermined time is added thereto according to execution of an action by the player character.

As described above, the timing of permitting execution of an action by the enemy character may be controlled without measuring the time. Even in this case, it is effective to display a relationship among one standby time set to an enemy character, an accumulated time and a predetermined time added to the accumulated time when the player character executes one action, on the game screen in the form of a graph. This is because such a graphic display allows the player to judge whether execution of an action by the enemy character is permitted when the player character executes an action.

The present invention has been described based on the first and second embodiments. The present invention is not limited to the foregoing first and second embodiments, but may variously be modified within its spirit and scope.

For example, the foregoing first and second embodiments describe a case in which the present invention is applied to fighting between the player character 300 and the enemy character 301. However, the application range of the present invention is not limited to the above case.

The foregoing first and second embodiments describe a case in which the present Invention is applied to an RPG. However, the application range of the present invention is not limited to an RPG, but may be applied to games of other genres in which permission for executing a character's possible action is controlled based on an elapsed time, such as SLGs and ADGs.

The foregoing first and second embodiments describe a case In which the present invention is realized using a home game machine as a platform. However, the present invention may be realized using a personal computer, or an arcade game as a platform.

In the foregoing first and second embodiments, programs and data are stored in a CD-ROM, and the CD-ROM is used as a recording medium. However, the recording medium is not limited to a CD-ROM, but may be another computer-readable magnetic or optical recording medium such as a magnetic disk or a ROM card, or semiconductor memory.

Provision of the programs and data for realizing the present invention is not limited to a form of provision from a recording medium such as a CD-ROM removably connected to a game machine or a computer, but may be a form in which the programs and data are preinstalled in the memory of a game machine or a computer. The programs and data for realizing the present invention may also be received from another unit connected via a communication link or the like before being recorded in a memory. In addition, by recording the programs and data in the memory of another unit connected by a communication link or the like, the programs and data may be used through the communication link or the like.

The description embodiments are only illustrative and various changes and modifications may be imparted thereto without departing from the scope of the invention which is limited solely by the appended claims.

What is claimed is:

1. A game apparatus in which a first character and a second character are displayed and said first character and said second character carry out attacks on each other in accordance with an inputted action command or a predetermined action schedule, said game apparatus comprising:
    setting means for setting an action timing at which said second character executes an action;
    adjustment means for adjusting said action timing set by said setting means in accordance with said inputted action command for said first character; and
    determination means for determining whether or not said second character is permitted to execute an action in accordance with whether or not said action timing adjusted by said adjustment means has come.

2. The game apparatus according to claim 1, further comprising clock means for clocking a rest time until said action timing adjusted by adjustment means; and
    display means for displaying said rest time clocked by said clock means.

3. A game apparatus in which a first character and a second character are displayed and said first character and said second character carry out attacks on each other in accordance with an inputted action command or a predetermined action schedule, said game apparatus comprising:
    clock means for clocking a time from end of a previous action of said second character or a predetermined reference time to provide a clock time;
    adjustment means for adjusting said clock time clocked by said clock means in accordance with said inputted action command for said first character; and
    determination means for determining whether or not said second character is permitted to execute an action in accordance with whether or not said clock time adjusted by said adjustment means is equal to or greater than a set time preset for said second character which possible to execute an action after said set time elapses.

4. The game apparatus according to claim 3, wherein said adjustment means comprises:
    addition means for adding a predetermined value to a value of said clock time clocked by said clock means to provide an addition value, In accordance with said inputted action command for said first character; and
    replacement means for replacing a value of said clock time to be clocked by said clock means with said addition value.

5. The game apparatus according to claim 3, further comprising display means for displaying said clock time and said set time.

6. The game apparatus according to claim 3, further comprising display means for displaying said clock time and said set time,
    wherein said time display means displays a ratio of said clock time to said set time by means of a graph.

7. A game apparatus in which a first character and a second character are displayed and said first character and said second character carry out attacks on each other in accordance with an inputted action command or a predetermined action schedule, said game apparatus comprising:
    clock means for clocking a time from end of a previous action of said second character or a predetermined reference time to provide a clock time;
    adjustment means for adjusting a set time preset for said second character which possible to execute an action after said set time elapses, in accordance with said inputted action command for said first character; and
    determination means for determining whether or not said second character is permitted to execute an action in accordance with whether or not said clock time clocked by said clock means is equal to or greater than said set time adjusted by said adjustment means.

8. The game apparatus according to claim 7, wherein said adjustment means comprises:
    subtraction means for subtracting a predetermined value from a value of said set time read out said memory to provide a subtraction value, in accordance with said inputted action command for said first character; and
    replacement means for replacing a value of said set time with said subtraction value.

9. The game apparatus according to claim 7, further comprising display means for displaying said clock time and said set time.

10. The game apparatus according to claim 7, further comprising display means for displaying said clock time and said set time,
    wherein said time display means displays a ratio of said clock time to said set time by means of a graph.

11. A method of adjusting an action timing of a character in a video game in which a first character and a second character are displayed and said first character and said second character carry out attacks on each other in accordance with an inputted action command or a predetermined action schedule, said method comprising:

a setting step for setting an action timing at which said second character executes an action;

an adjustment step for adjusting said action timing set in said setting step in accordance with said inputted action command for said first character; and a determination step for determining whether or not said second character is permitted to execute an action in accordance with whether or not said action timing adjusted in said adjustment step has come.

12. A method of adjusting an action timing of a character in a video game in which a first character and a second character are displayed and said first character and said second character carry out attacks on each other in accordance with an inputted action command or a predetermined action schedule, said method comprising:

a clock step for clocking a time from end of a previous action of said second character or a predetermined reference time to provide a clock time;

an adjustment step for adjusting said clock time clocked in said clock step in accordance with said inputted action command for said first character; and a determination step for determining whether or not said second character is permitted to execute an action in accordance with whether or not said clock time adjusted in said adjustment step is equal to or greater than a set time preset for said second character which possible to execute an action after said set time elapses.

13. A method of adjusting an action timing of a character in a video game in which a first character and a second character are displayed and said first character and said second character carry out attacks on each other in accordance with an inputted action command or a predetermined action schedule, said method comprising:

a clock step for clocking a time from end of a previous action of said second character or a predetermined reference time to provide a clock time;

an adjustment step for adjusting a set time preset for said second character which possible to execute an action after said set time elapses, in accordance with said inputted action command for said first character; and a determination step for determining whether or not said second character is permitted to execute an action in accordance with whether or not said clock time clocked in said clock step is equal to or greater than said set time adjusted in said adjustment step.

14. A computer-readable storage medium storing a program for causing a computer to execute a video game in which a first character and a second character are displayed and said first character and said second character carry out attacks on each other in accordance with an inputted action command or a predetermined action schedule, said program comprising:

a first step for setting an action timing at which said second character executes an action;

a second step for adjusting said action timing set in said first step in accordance with said inputted action command for said first character; and a third step for determining whether or not said second character is permitted to execute an action in accordance with whether or not said action timing adjusted in said second step has come.

15. A computer-readable storage medium storing a program for causing a computer to execute a video game in which a first character and a second character are displayed and said first character and said second character carry out attacks on each other in accordance with an inputted action command or a predetermined action schedule, said program comprising:

a first step for clocking a time from end of a previous action of said second character or a predetermined reference time to provide a clock time;

a second step for adjusting said clock time clocked in said first step in accordance with said inputted action command for said first character; and a third step for determining whether or not said second character is permitted to execute an action in accordance with whether or not said clock time adjusted in said second step is equal to or greater than a set time preset for said second character which possible to execute an action after said set time elapses.

16. A computer-readable storage medium storing a program for causing a computer to execute a video game in which a first character and a second character are displayed and said first character and said second character carry out attacks on each other in accordance with an inputted action command or a predetermined action schedule, said program comprising:

a first step for clocking a time from end of a previous action of said second character or a predetermined reference time to provide a clock time;

a second step for adjusting a set time preset for said second character which possible to execute an action after said set time elapses, in accordance with said inputted action command for said first character; and a third step for determining whether or not said second character is permitted to execute an action in accordance with whether or not said clock time clocked in said first step is equal to or greater than said set time adjusted in said second step.

* * * * *

UNITED STATES PATENT AND TRADEMARK OFFICE
CERTIFICATE OF CORRECTION

PATENT NO. : 6,273,814 B1
DATED : April 14, 2001
INVENTOR(S) : N. Komoto

It is certified that error appears in the above-identified patent and that said Letters Patent is hereby corrected as shown below:

<u>Title page,</u>
Item [57], ABSTRACT,
Line 12, "In" should be -- in --.

<u>Column 20,</u>
Line 14, "In" should be -- in --.

Signed and Sealed this

Fourth Day of June, 2002

Attest:

Attesting Officer

JAMES E. ROGAN
*Director of the United States Patent and Trademark Office*